Dec. 2, 1969            C. F. RYDER            3,482,263
IMBEDDED ELECTRICAL FITTING AND CORD ASSEMBLY
Filed June 16, 1967
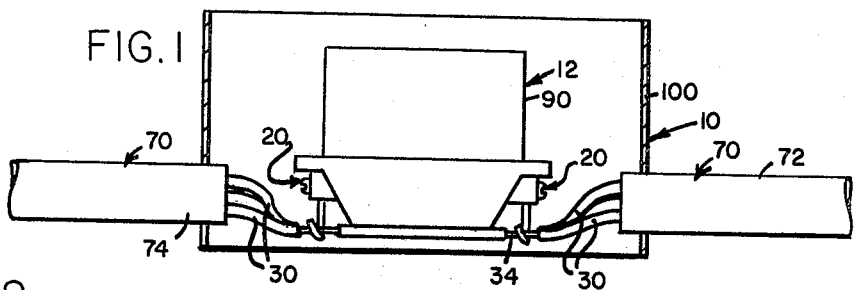
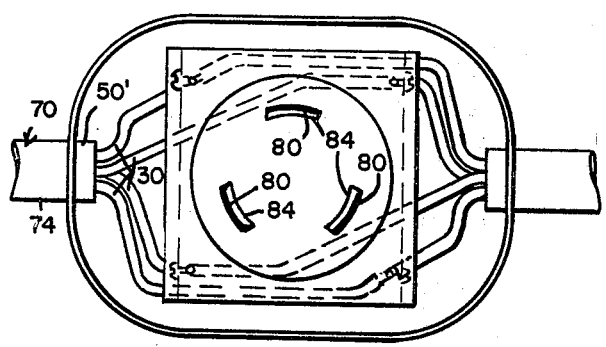
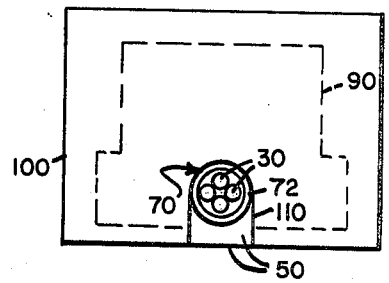
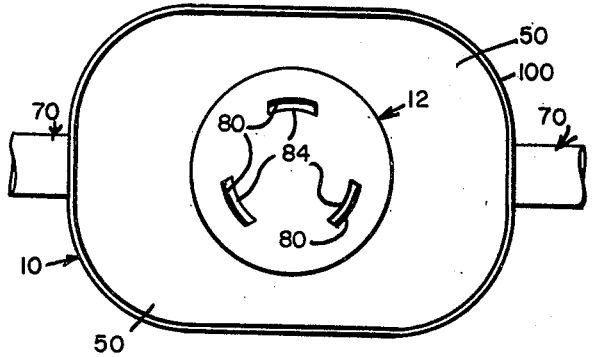
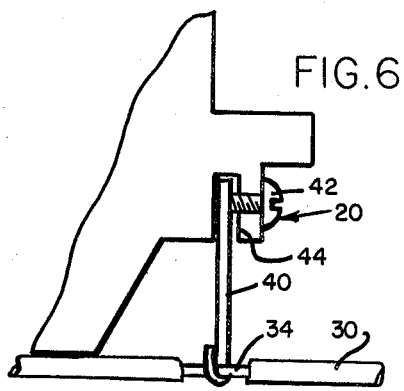
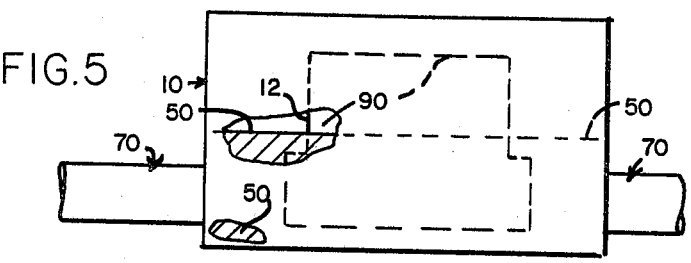
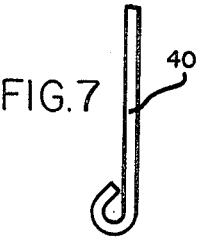
INVENTOR.
CHARLES F. RYDER
BY United States Patent Office 3,482,263
Patented Dec. 2, 1969

3,482,263
IMBEDDED ELECTRICAL FITTING AND CORD
ASSEMBLY
Charles F. Ryder, Box 513, Gordon, Nebr. 69343
Filed June 16, 1967, Ser. No. 646,565
Int. Cl. H01r 13/52, 13/58, 33/72
U.S. Cl. 339—102                                    7 Claims

ABSTRACT OF THE DISCLOSURE

An electrical fitting having wires attached thereto protected by encasement of a portion of the fitting and wires in thermoplastic material. The fitting described further having a casing extending around the thermoplastic material and extending upwardly in spaced relation to and protecting an upwardly protruding portion of the body member of the fitting.

---

The background of this invention is in the field of electrical fittings used on extension cords on the job-sites of the building industry in which such fittings become crushed and broken very easily and experience extremely rough useage. Such extension cords are often in the rain and mud.

This invention permits the bare wiring at the electrical fitting to be completely enclosed in hard thermoplastic material, protected from the rain and from damage and further secures ends of the insulation portions of electrical cable inside and protected by the hard thermoplastic material.

In the drawings:

FIGURE 1 is a side elevation of the electrical fitting of this invention with a portion of the casing and the entire protector removed for purposes of illustration.

FIGURE 2 is a top plan view of the parts shown in FIGURE 1.

FIGURE 3 is a right end view of the parts shown in FIGURE 1.

FIGURE 4 is a top plan view of the new electrical fitting in its entirety.

FIGURE 5 is a side elevation of the new fitting as it would be seen from the bottom in FIGURE 4 with portions thereof removed to show the position of a protector layer of hard material therein.

FIGURE 6 is a detail in the area of the right-hand side of an electrical fitting body member shown in side elevation as it would be seen in FIGURE 1, but enlarged.

FIGURE 7 is a detail of an electrical connector otherwise best seen in FIGURES 1 and 6.

Referring to the drawings, and in FIGURE 5, an electrical fitting of this invention is there shown at 10 having a body member 12 of conventional sort, the latter having electrical terminals best seen at 20 in FIGURES 1 and 6. A plurality of wires generally indicated at 30 are disposed adjacent to and extending under the body member 12. Each wire 30 has a portion 34 which is scraped bare of its insulation 36 and to which an electrical connection wire 40 is attached having a portion extending upwardly into a conventional terminal recess 44 to be engaged firmly there by a conventional set screw 42, the wires 30 are each spaced with respect to each other and insulated from each other and held at these spacings and insulated also by a protector 50 which is a layer of thermoplastic material disposed around those portions of the wires 30 which are free of the jacket of insulation 50 which surrounds the remainder of the wires 30 whereby the jacket 50 and wires 30 together form an electrical cable generally indicated at 70 having a portion 72 and a portion 74 which still have the full insulation jacket 50 on them, the portions 72 and 74 extending inwardly of the thermoplastic material 50 so as to be anchored therein and protected thereby.

The protector 50 is specifically formed of a catalyst base thermoplastic material.

The conventional electrical fitting body member 12 has electrically conductive elements 80 protruding beyond the protector 50 and specifically protruding upwardly therefrom. The elements 80 are received in recesses 84 of a portion of the body member 12 which protrudes upwardly beyond the protector 50 as best seen at 90, although it will be understood that this is only when a socket-type electrical fitting is described and this invention is not necessarily limited to a socket-type electrical fitting.

A casing 100 is provided which is preferably formed of metal and which is of an anular shape in top plane view, somewhat elongated in the direction of the elongation of the cable 70, the casing 100 extending upwardly beyond the protector 50 on that upper side of the protector 50 on which the body member portion 90 protrudes, the casing 100 also protruding upwardly beyond the upwardly protruding portion 90 of the body member 12 and beyond the electrical elements 80 for shielding the body member 12 and the electrical elements 80 from danger, such as being crushed.

It is important that portions of the insulation 50' on the outer side of the cable 70 are partially disposed inside the protector 50 with portions of the wires 30 which protrude from the inner end 120 or 122 of the outer insulation 50' being disposed within the protector 50.

In operation, it will be found that the electrical fitting as described herein will be exceedingly rugged and will fulfill the objectives above set forth.

I claim:

1. An electrical fitting having a protector of thermoplastic material, a body member, electrical terminals on said body member, at least two interior wire means adjacent said body member, means electrically connecting each of said interior wire means to one of said terminals, and said protector being disposed around portions of said interior wire means, said connecting means and said terminals, and said protector being connected to said body member, four entering wire means entering said protector from the outer side thereof, insulation means surrounding portions of said entering wire means which protrude from said protector and also extending into said protector and being secured thereto, means connecting two of said four entering wire means with one of said two interior wire means, and means connecting the other two of said four entering wire means with the other one of said two interior wire means.

2. The combination of claim 1 in which said plastic material is specifically a catalyst base thermoplastic material.

3. The combination of claim 1 in which said electrical fitting body member has electrically conductive elements protruding beyond said protector, and further has a casing having a portion of annular shape surrounding said protector and extending beyond said protector on that side of said protector on which said body member protrudes beyond said protector, said casing protruding also beyond said body member and said conductive elements for shielding the latter from danger.

4. The combination of claim 1 in which said four entering wire means are arranged in two pairs, two of said pairs entering said protector at a point spaced from the place where the other pair enters said protector, and each pair of entering wire means being surrounded by a separate outermost insulation means so as to form a cable, said two cables extending into and being connected to said protector.

5. The combination of claim 1 in which said two interior wire means each are integrally connected to two of said four entering wire means, whereby there are, in effect, two wires extending completely through said protector.

6. The combination of claim 1 in which there is an outer casing having a portion of annular shape surrounding and attached to said protector, said outer casing having openings in it, said four entering wire means extending out through said openings in said casing, said casing being of a more malleable substance than said protector.

7. The combination of claim 6 in which said outer casing is specifically made of metal.

References Cited
UNITED STATES PATENTS

| | | |
|---|---|---|
| 485,587 | 11/1892 | Potter et al. _____ 339—102 |
| 654,433 | 7/1900 | Bragdon _____ 339—102 |
| 1,161,454 | 11/1915 | Covit _____ 339—102 |
| 2,195,975 | 4/1940 | Ribble et al. _____ 339—102 X |
| 2,701,867 | 2/1955 | Obenschain et al. ____ 339—102 |
| 661,512 | 4/1963 | Canada. |

RICHARD E. MOORE, Primary Examiner

U.S. Cl. X.R.

339—175, 192, 207